US007013816B2

(12) United States Patent
Herlt

(10) Patent No.: US 7,013,816 B2
(45) Date of Patent: Mar. 21, 2006

(54) METHOD FOR GASIFYING LARGE PIECES OF SOLID FUELS, ESPECIALLY BALES OF BIOMASS

(76) Inventor: Christian Herlt, An der Buchen 2, 17194 Vielist (DE)

( * ) Notice: Subject to any disclaimer, the term of this patent is extended or adjusted under 35 U.S.C. 154(b) by 0 days.

(21) Appl. No.: 10/317,001

(22) Filed: Dec. 11, 2002

(65) Prior Publication Data

US 2005/0061218 A1 Mar. 24, 2005

Related U.S. Application Data

(63) Continuation of application No. PCT/DE01/02214, filed on Jun. 12, 2001.

(30) Foreign Application Priority Data

Jun. 13, 2000 (DE) .................. 100 28 394

(51) Int. Cl.
*F23B 7/00* (2006.01)
(52) U.S. Cl. ..................... 110/341; 110/229
(58) Field of Classification Search ........... 110/229, 110/230, 231, 196, 197, 234, 342, 343, 341; 48/197 R
See application file for complete search history.

(56) References Cited

U.S. PATENT DOCUMENTS

| 3,920,417 | A | * | 11/1975 | Fernandes ................. 48/197 R |
| 4,050,390 | A | * | 9/1977 | Hara et al. .................. 110/342 |
| 4,164,397 | A | * | 8/1979 | Hunt et al. ................... 48/209 |
| 4,306,506 | A | * | 12/1981 | Rotter ........................ 110/229 |
| 4,359,326 | A | * | 11/1982 | Hoffert et al. .............. 48/62 R |
| 4,981,089 | A | * | 1/1991 | Spliethoff et al. .......... 110/229 |
| 5,787,822 | A | * | 8/1998 | Hilliard ...................... 110/229 |
| 6,119,607 | A | * | 9/2000 | Guy et al. .................. 110/346 |

FOREIGN PATENT DOCUMENTS

| DE | 3109917 A1 | * | 11/1982 |
| DE | 3327662 A1 | * | 2/1985 |
| DE | 19531821 A1 | * | 2/1997 |
| DE | 19648639 A1 | * | 4/1998 |
| DE | WO98/19108 | * | 5/1998 |
| DE | 19720331 A1 | * | 11/1998 |
| EP | 0 045 256 A | | 2/1982 |
| GB | 2193200 A | * | 2/1988 |

* cited by examiner

*Primary Examiner*—Kenneth Rinehart
(74) *Attorney, Agent, or Firm*—Goodwin Procter, LLP

(57) ABSTRACT

The invention relates to a method and a device for carbonizing large pieces of solid fuels, preferably bio fuels and is particularly suitable for gasifying large bales of grain straw and hay, which have not been comminuted. It is an object of the invention to provide a device and a method, with which whole bales and other large pieces of gasifiable material can be broken down under controlled conditions with little thermal energy.

16 Claims, 5 Drawing Sheets

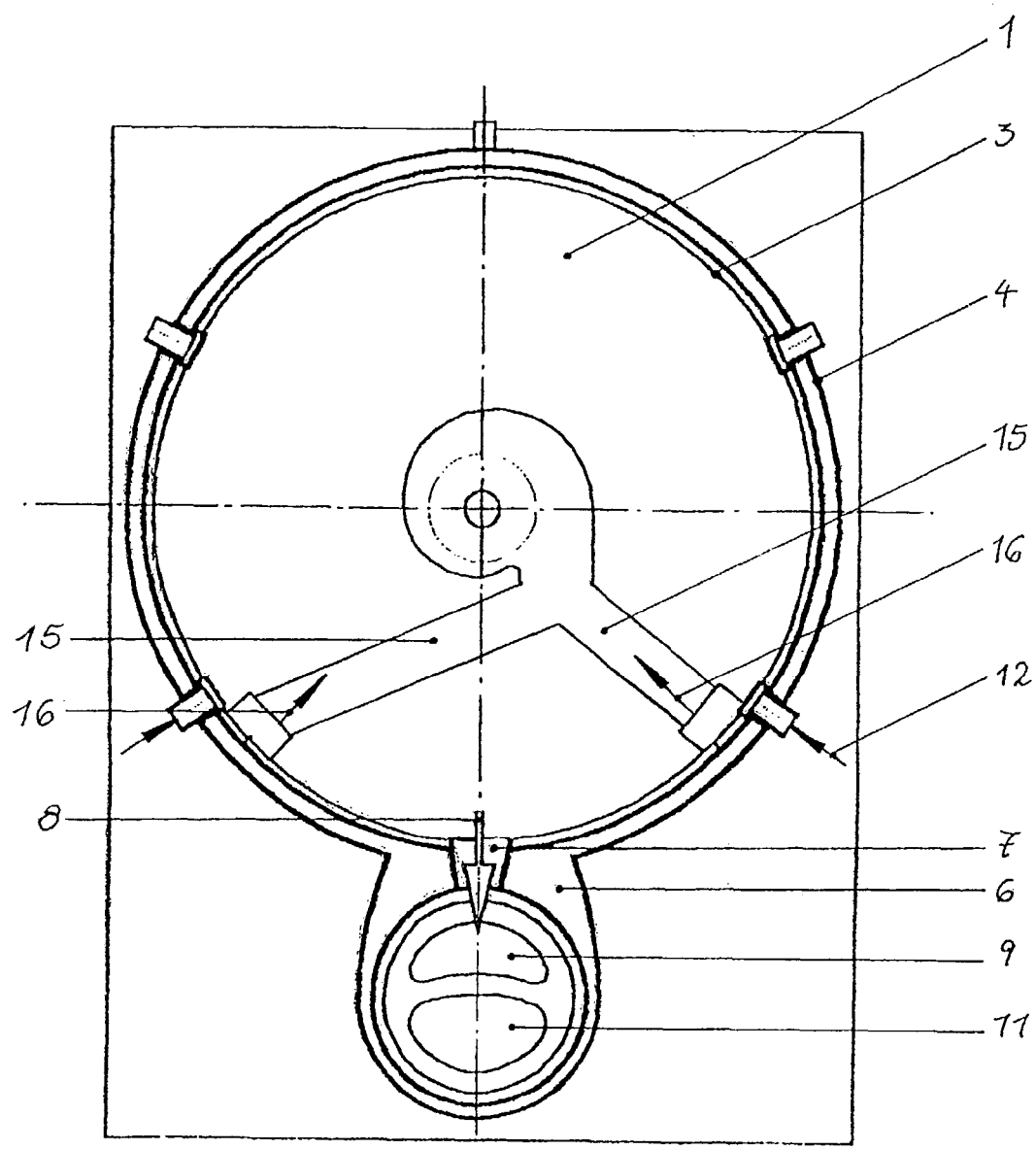
Fig. I

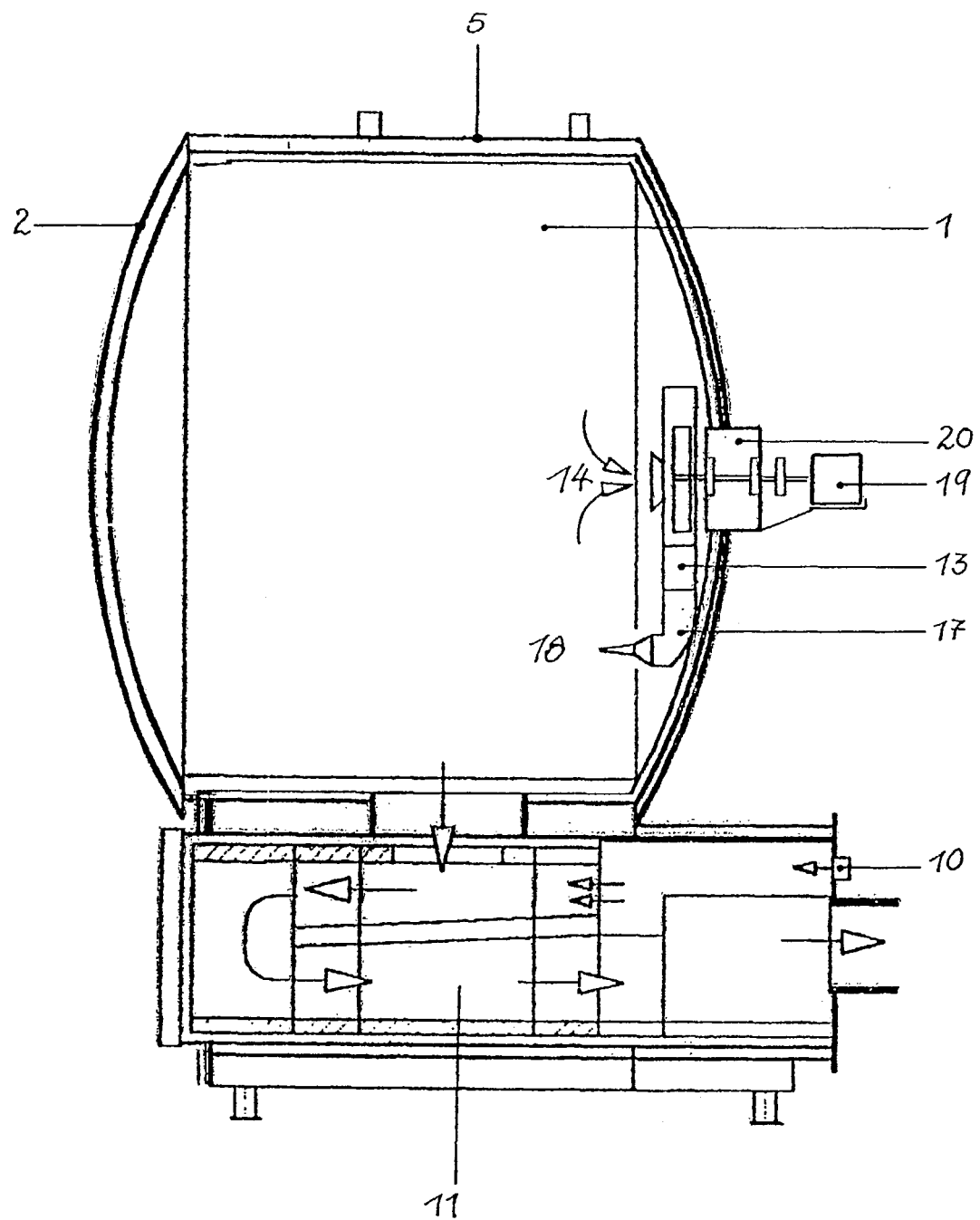
Fig. II

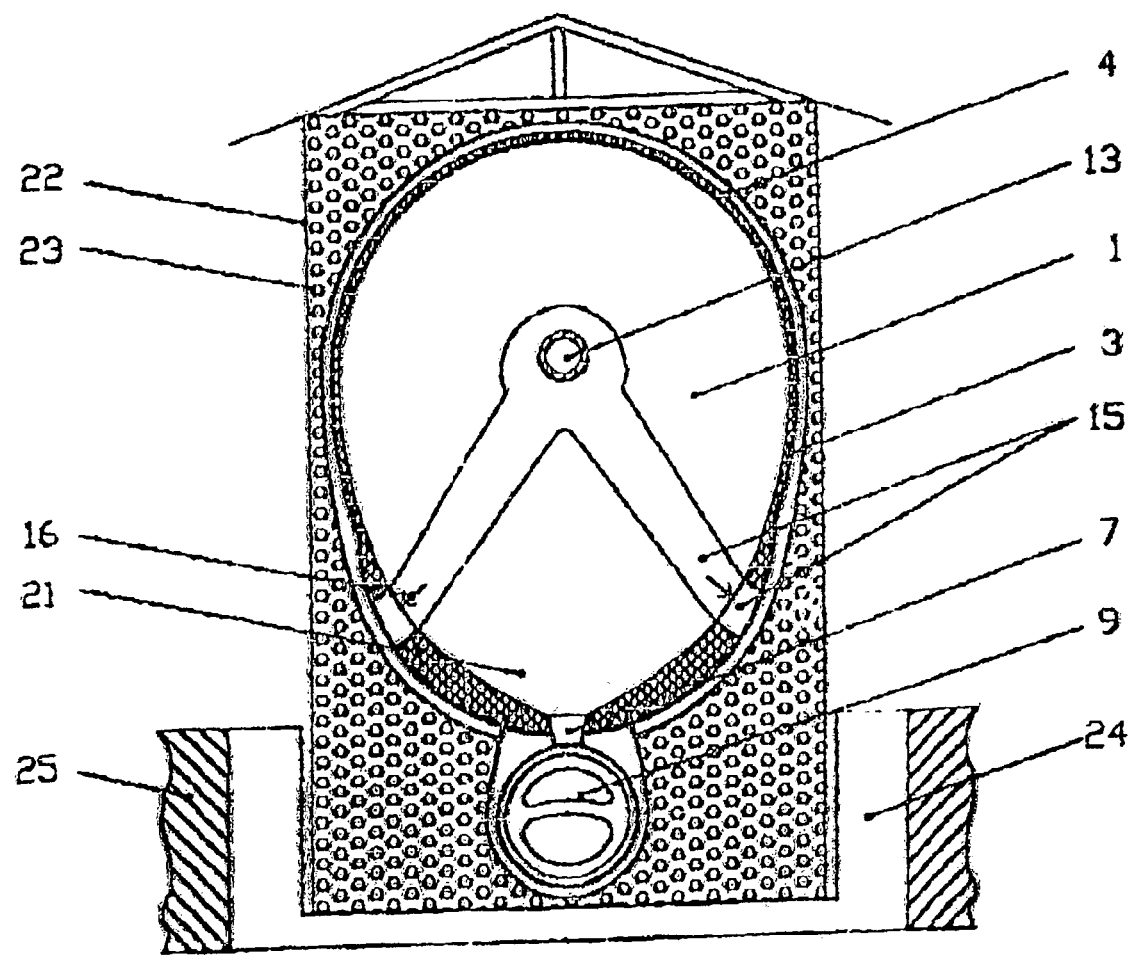

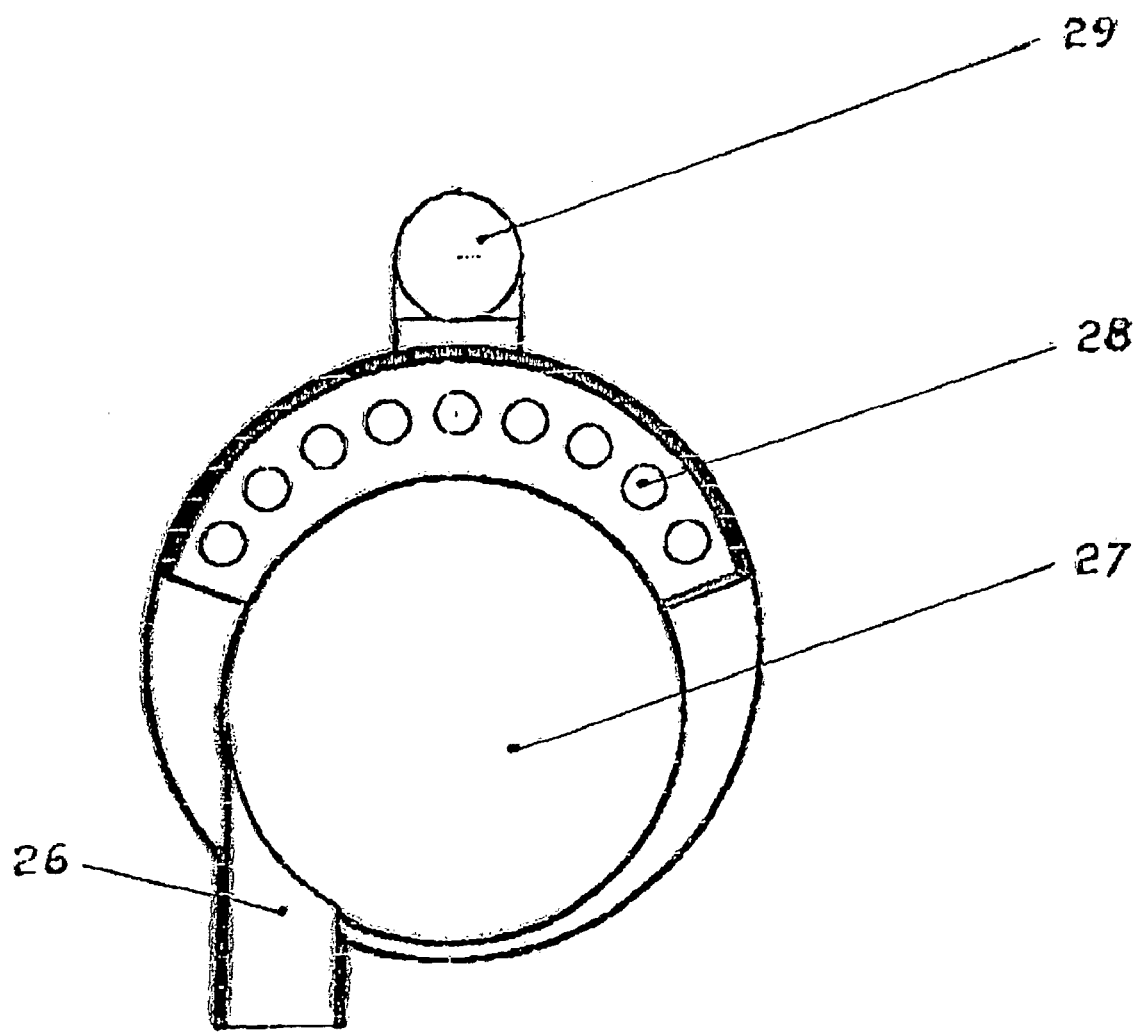
Fig. IV

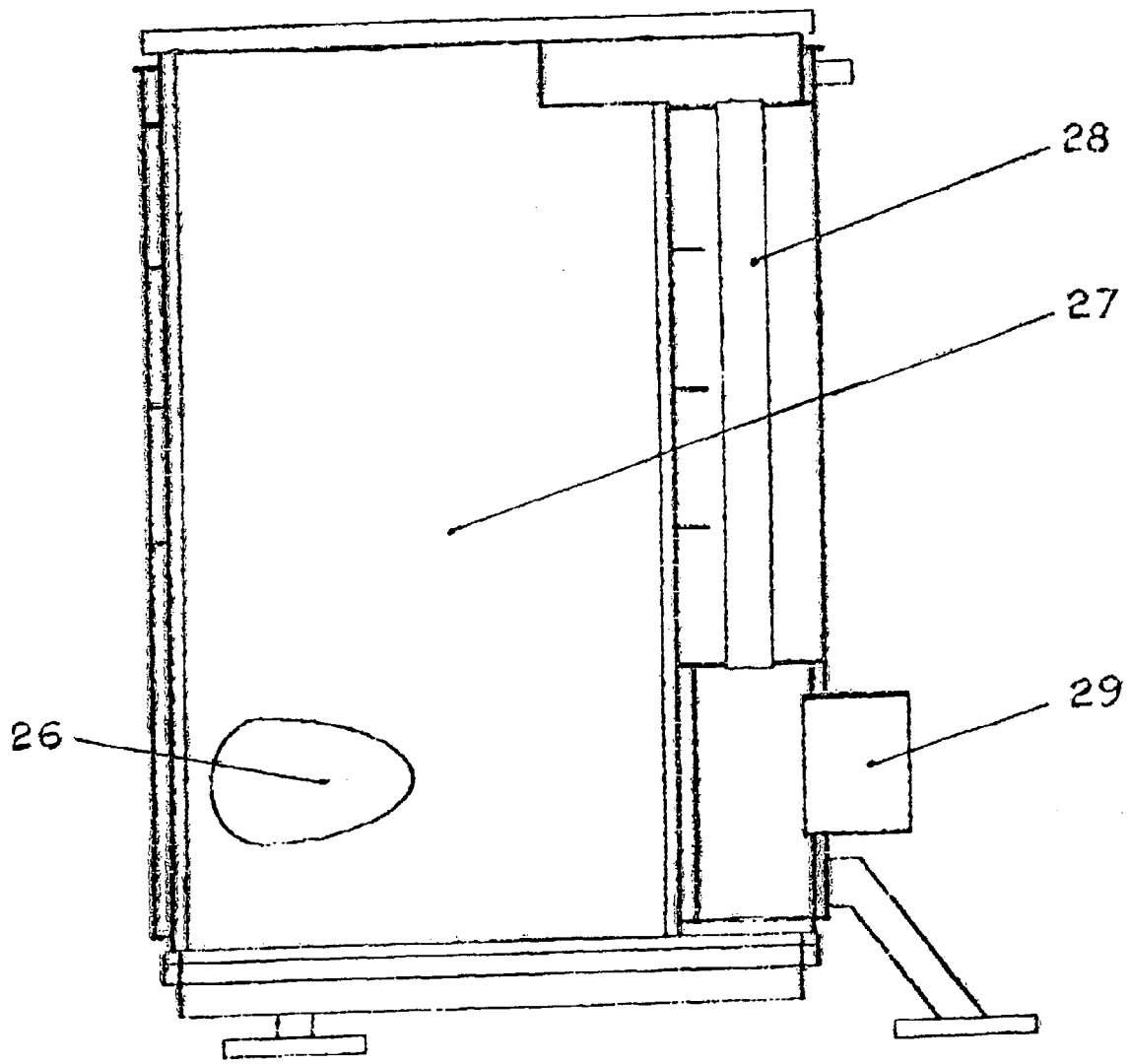
Fig. V

METHOD FOR GASIFYING LARGE PIECES OF SOLID FUELS, ESPECIALLY BALES OF BIOMASS

This is a continuation of International Application No. PCT/DE01/02214, which was filed on Jun. 12, 2001, and published on Dec. 20, 2001 and is entitled to priority of German Patent Application No. 100 28 394.2 filed Jun. 13, 2000.

The invention relates to a method and a device for gasifying pieces of solid fuels, preferably bio fuels. It is particularly suitable for carbonizing large bales of grain straw and hay, which have not been comminuted.

It is difficult to burn or carbonize pressed bales with little energy because, after the pyrolysis gases have been emitted, initially stalk-like structures of straw coke from the straw, in which much ash is incorporated, remain behind. Accordingly, a layer, which closes off the still unburned bale from temperature and the access of air and furthermore causes an unwillingness to burn or gasify, is formed. For this reason, a continuous progression of the gasification of the bale, after an initially good reaction with little thermal energy can be realized only with additional process steps and special devices.

The mechanical comminution of the bales for this purpose, before the thermal utilization, is known. However, such a process is technically expensive and, particularly in the case of small plants, decreases the economic efficiency of the utilization of the straw.

According to DE-OS 33 27 662, it is furthermore known that, by cutting openings in the bales for supplying combustion air, a larger, reacting, combustion surface is created. This measure is satisfactory, however, only in the case of a high combustion energy.

In the DE-OS 42 22 663, the bales are broken down by glowing rods into smaller parts, which can then be carbonized more easily because of the larger surface area. For this purpose, however, heat energy must be supplied from outside to the glowing rods and, because of the high temperatures, also causes an increased expense for their construction and durability.

Even by injecting combustion air, as described, for example, in the DE-OS 196 48 639, complete carbonization or combustion of the bale can be achieved only at a thermal energy and a high injection pressure. In order to achieve the objective of breaking down the bale, much air is required. However, in order to achieve a high-grade fuel gas, the least possible amount of combustion air should reach the gasification region. For this reason, it was proposed in the DE-OS 19 72 03 31 to recycle hot, burned-out exhaust gases to the degassing furnace, in order to bring about a greater reaction due to the high temperature in the gasifier and the action of the flowing gases. As a result, however, the proportion of inert gas in the resulting fuel gas increases appreciably and the energy content and the ignition quality decrease correspondingly.

For this reason, mechanical ash strippers are also used according to DE OS 31 09 917 in order to maintain the combustibility of the bale. However, to position these optimally and employee them in practical operations in accordance with the thermal and mechanical loads that arise, is structurally difficult and expenses in the implementation.

Firing up the heating boilers for gasifying the straw creates problems with the known solutions, since straw bales frequently are moist on the outside. There is no space for heating-up material.

The straw ash contains fractions with a relatively low melting point of about 600° C. These can lead to bothersome caking at the colder surfaces. This takes place particularly at steel parts of the heat exchanger and leads to an appreciably inferior heat transfer. The removal of the slag layer formed is relatively expensive.

It is an object of the invention to provide a device and a method, with which whole bales and other large pieces of materials, which can be gasified, can be broken down under controlled conditions with little thermal energy, moist combustible material is fired up easily, encrustations on the heat exchangers are prevented and the disadvantages of the known solutions are avoided.

Pursuant to the invention, this objective is accomplished owing to the fact that the material, which is to be gasified, is acted upon with the same gas, which is present in the gasification space and, for this purpose, is integrated with a ventilator unit, which is temperature resistant and driven with energy supplied from the outside. Accordingly, it is achieved that free oxygen and the heat, transported with the gas, can penetrate the bales and the combustible material filling and that the process of the thermal decomposition proceeds in spite of the formation of ash and coke or having only a small contact area. In a development of the invention, channels are connected to the ventilator unit and pass the moving gas to the places, which are advantageous for the decomposition of the gasifiable material and at which then the gas flows out of openings against the material, which is to be gasified. By changing the output of the ventilator unit, the gasification process, together with the supply of oxygen to the gasifying space, can be controlled. By means of this procedure, complete carbonization even of incombustible materials is achieved, such as round the bales of grain straw with a diameter of 1.8 m, which are solidly compressed and moist, having been stored outside. This is accomplished with only a slight gasification energy, which corresponds to a firing energy of the gas produced of at least 60 kW. The ventilator unit is constructed so that the mechanical loads produced by the fuel and the feeding operation, do not lead to any impairment and preferably is built into the gasification space. It may, however, also be placed outside and the parts of the ventilator unit, contacting the walls of the ventilator space, shall consist of materials, which are suitable for the temperatures of up to about 500° C., which occurred. The ventilator unit is operated with energy from the outside and preferably has an electric motor.

Due to the use of the invention, the large amounts of grass-like and stalk-like materials, which arise in agriculture and landscape care, the plants cultivated for the purpose of recovering energy and the residues of material plant utilization, can be processed into large bales and obtained, stored and utilized decentrally for energetic and material utilization. The thereby possible carbonization of whole bales to high-grade fuel gas with little energy creates the prerequisites for realizing clean combustion in decentralized firing installations, preferably in rural areas and also the material utilization of the bales in future utilization lines. Due to the use of the invention in gasification plants for other materials in pieces, such as chopped wood or garbage, appreciable stabilization and intensification of the gasification process can be achieved and the material, which is to be gasified, may be larger in size and more bulky. The amount of combustion air added can be reduced; the fuel gas contains less oxygen and inert gas and therefore is more valuable for utilization in the combustion engine.

The invention can thus be used generally, in order to be able to realize large gasification spaces, so to lessen the necessary comminution of bio fuel before the gasification and to improve the ability to control the process.

There is space for kindling material due to a gasification space of claim 8, which is expanded at the bottom. With that, problem-free igniting of moist straw bales is made possible.

In a further development of the invention of FIG. 4, the sub-assembly for transferring the heat of the heating gas to the boiler water contains, first of all, a region, the surface of the metallic, water-cooled wall of which has a ceramic coating at which caking can hardly take place. In this first spatial region, the waste gas is cooled to a temperature below 600° C., so that subsequently only solid ash is contained in the waste gas. Furthermore, this space is designed so that, by cyclone action and/or by sedimentation, fly ash can be removed from the waste gas in a known manner.

The invention is to be described in greater detail in the following by means of an example.

For this purpose

FIG. I shows a straw bale gasifier furnace in cross section with two gas-supplying channels, laterally disposed opposite to one another, FIG. II shows a similar installation in longitudinal section with only one blow-out direction, FIG. III shows a straw bale gasified in cross section with a gasification space, which is enlarged in the downward direction in a free arrangement, FIG. IV shows a heat exchanger in cross section.

FIG. V shows the same heat exchanger in longitudinal section.

The round bale of straw, which is not shown, is placed through the large charging opening 2, which can be closed off, into the somewhat larger gasification space. The whole of the gasification space 1 is lined on the inside with a ceramic layer 3, in order to keep the flow of heat through the steel walls 4 of the body of the boiler 5 into the boiler water 6 as low as possible. At the bottom of the gasification space, a slot 7 is provided, through which the carbonization gases 8, symbolized by the arrow, enter the vortex burner chamber 9, are mixed there with secondary air 10 and combusted completely in the after burner chamber 11. The entry of combustion air into the gasification space 1 is controlled by the primary air openings 12. The ventilator unit 13 aspirates gas 14 from the gasification space 1 and forces this through the gas supplying channels 15 and the gas outlet openings 16, which are disposed therein and may also constructed in the form of nozzles, in an accelerated fashion against the straw bales.

In FIG. I, gas-supplying channels 15, on which the bale of straw rests, are provided on both sides opposite one another. On the other hand, only one gas-supplying channel 17, which acts only on the rear end face of the bale with accelerated, hot gas 18, is shown in FIG. II. This is simpler to realize and, in many cases, is sufficient, especially when the injection pressure is elevated. The ventilator unit 13 is driven by an externally disposed electric motor 19. The shaft bearing 20 contains a heat-resistant, approximately gas-tight shaft seal to the gasification space 1 and cooling system for the bearing. The details of the shaft seal are not shown. The straw bale/gasifier/furnace installation can also be constructed so that a second bale can be placed on the first, as a result of which, in conjunction with a suitable bale lock, a continuous operation of the furnace becomes possible.

In FIG. III, the gasification space 1, which becomes narrower towards the bottom, is expanded by the space for the kindling wood 21. To start the boiler, a small pile of firewood is placed on the slot 7, on which a small fire, for example that of a burning coal igniter, starts the induced draft blower and the boiler burns almost smoke-free, like a known induced draft wood gasifier heating boiler. After that, further firewood can be added to space 21 and the straw bale, which may also contain moist straw, is then placed upon the firewood. The gasifying heating boiler for straw bales of FIG. III is freestanding and is therefore lined on the outside with sheet metal 22. The actual body of the boiler is insulated, preferably with bulk insulation material 23, to prevent heat losses. For better accessibility, the stand is sunk into the ground 25 and rests on a foundation 24.

In FIG. IV, the heat exchanger unit is shown, in which the hot gases, coming from the installation of FIG. I, flow through the heating gas inlet channel 26 into the spatial region 27, in which they rise against the force of gravity. Due to the cyclone effect and also the sedimentation effect resulting from the large cross section of the space, the ash is deposited in the downward direction. The water-cooled spatial region 27 is provided with a ceramic surface coating, which is not shown. In this region, the heating gas is cooled to 600° C. Further heat is emitted to the boiler water in the heat exchanger pipes 28. The exhaust gas passes through the exhaust gas-connecting piece 29 and through an induced draft blower, which is not shown, and supplied to the chimney.

In FIG. V, the sub-assembly of FIG. IV is illustrated once again in longitudinal section. The spatial region 27 may also have the distinguishing configuration features of a known dust deposition cyclone.

The gasification-heating boiler 1 may also have a different shape for accommodating square bales.

The invention claimed is:

1. A method for the gasification of large pieces of solid fuels, comprising:
   placing material to be gasified in a gasification space;
   placing fuel for kindling at an expansion in the lower region of the gasification space relative to the cross sectional shape of the material to be gasified;
   partially combusting the material by adding combustion air, so that heat is evolved;
   bringing about gasification of the remaining material with the heat;
   aspirating gas present in the gasification space with a ventilator unit; and
   blowing the gas in an accelerated fashion into the gasification space against the material to be gasified.

2. The method of claim 1, wherein the gas is supplied to places in the gasification space, along which the material to be gasified moves as a consequence of the action of gravity.

3. The method of claim 1, wherein the gasification process is controlled by changing the energy of the ventilator unit.

4. The method of claim 1, wherein the gas is combusted and then cooled to a temperature of about 600° C. in a spatial region of a heat exchanger, the wall surfaces of which are coated with a ceramic material.

5. The method of claim 1, wherein gas-guiding channels are disposed downstream from the ventilator unit at the back of the gasification space, through which the gas is passed through nozzles to the places in the gasification space, where the gas emerges as accelerated hot gas and intensifies the gasification.

6. The method of claim 1, wherein said solid fuels are bales of biomass.

7. A method for the gasification of large pieces of solid fuels, particularly biomass, for which the material, which is to be gasified, is placed in a gasification space, partially comubusted by the addition of combustion air, so that heat is evolved, which brings about the gasification of the remaining material, wherein the gas, present in the gasification space, is aspirated with a ventilator unit and then blown in an accelerated fashion into the gasification space against the material, which is to be gasified, wherein the gas, produced pursuant to the method, is combusted and then, in a first step, cooled to a temperature of 600° C. in a spatial region of a heat exchanger, the wall surfaces of which are coated with a ceramic material.

8. A method for the gasification of large pieces of solid fuels, comprising:
  placing material to be gasified in a gasification space, said material being one or more bales of biomass;
  partially combusting the material by adding combustion air, so that heat is evolved;
  bringing about gasification of the remaining material with the heat;
  aspirating gas present in the gasification space with a ventilator unit; and
  blowing the gas in an accelerated fashion into the gasification space against the material to be gasified.

9. The method of claim 8, wherein the gas is supplied to places in the gasification space, along which the material to be gasified moves as a consequence of the action of gravity.

10. The method of claim 8, wherein the gasification process is controlled by changing the energy of the ventilator unit.

11. The method of claim 8, wherein the gas is combusted and then cooled to a temperature of about 600° C. in a spatial region of a heat exchanger, the wall surfaces of which are coated with a ceramic material.

12. The method of claim 8, wherein gas-guiding channels are disposed downstream from the ventilator unit at the back of the gasification space, through which the gas is passed through nozzles to the places in the gasification space, where the gas emerges as accelerated hot gas and intensities the gasification.

13. The method of claim 8, further comprising placing additional fuel for kindling at an expansion in the lower region of the gasification space relative to the cross sectional shape of the material to be gasified.

14. The method of claim 8, wherein said material to be gasified is one or more large bales of grain straw or hay.

15. A method for the gasification of large pieces of solid fuels, comprising:
  placing material to be gasified in a gasification space;
  placing fuel for kindling at an expansion in the lower region of the gasification space relative to the cross sectional shape of the material to be gasified;
  partially combusting the material by adding combustion air, so that heat is evolved;
  bringing about gasification of the remaining material with the heat;
  aspirating gas present in the gasification spare with a ventilator unit; and
  blowing the gas in an accelerated fashion into the gasification space directly against the material to be gasified without mixing with additional combustion air.

16. The method of claim 8, wherein the step of blowing the gas in an accelerated fashion into the gasification space directly against the material to be gasified is conducted without mixing with additional combustion air.

* * * * *